US008467805B2

(12) United States Patent
Harper

(10) Patent No.: US 8,467,805 B2
(45) Date of Patent: Jun. 18, 2013

(54) SYSTEM AND METHOD FOR DETERMINING A REFERENCE LOCATION USING CELL TABLE DATA MINING

(75) Inventor: Neil Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 701 days.

(21) Appl. No.: 12/437,969

(22) Filed: May 8, 2009

(65) Prior Publication Data

US 2010/0285813 A1 Nov. 11, 2010

(51) Int. Cl.
*H04W 24/00* (2009.01)
(52) U.S. Cl.
USPC .............. 455/456.1; 455/404.2; 455/440; 455/456.2; 455/456.3; 455/456.4; 455/456.5; 455/456.6; 455/457
(58) Field of Classification Search
USPC .............. 455/404.2, 440, 456.1–456.6, 457
See application file for complete search history.

(56) References Cited

U.S. PATENT DOCUMENTS

| 4,728,959 | A | 3/1988 | Maloney |
| 5,327,144 | A | 7/1994 | Stilp et al. |
| 5,608,410 | A | 3/1997 | Stilp et al. |
| 5,959,580 | A | 9/1999 | Maloney et al. |
| 6,047,192 | A | 4/2000 | Maloney |
| 6,091,362 | A | 7/2000 | Stilp |
| 6,097,336 | A | 8/2000 | Stilp |
| 6,097,709 | A | 8/2000 | Kuwabara |
| 6,101,178 | A | 8/2000 | Beal |
| 6,108,555 | A | 8/2000 | Maloney et al. |
| 6,108,558 | A | 8/2000 | Vanderspool, II |
| 6,115,599 | A | 9/2000 | Stilp |
| 6,115,605 | A | 9/2000 | Siccardo et al. |
| 6,119,013 | A | 9/2000 | Maloney et al. |
| 6,127,975 | A | 10/2000 | Maloney |
| 6,172,644 | B1 | 1/2001 | Stilp |
| 6,184,829 | B1 | 2/2001 | Stilp |
| 6,266,013 | B1 | 7/2001 | Stilp et al. |
| 6,269,246 | B1 | 7/2001 | Rao et al. |
| 6,281,834 | B1 | 8/2001 | Stilp |
| 6,285,321 | B1 | 9/2001 | Stilp et al. |
| 6,288,675 | B1 | 9/2001 | Maloney |

(Continued)

FOREIGN PATENT DOCUMENTS

WO 2006102508 A1 9/2006

OTHER PUBLICATIONS

Tolga Goze; "Secure User-Plane Location (SUPL) Architecture for Assisted GPS (A-GPS)" IEEE; Department of Electrical & Computer Eng.; Koc University, Istanbul, Turkey; 2008; pp. 229-234.

(Continued)

*Primary Examiner* — Wayne Cai
*Assistant Examiner* — Matthew Genack
(74) *Attorney, Agent, or Firm* — Duane Morris LLP

(57) ABSTRACT

A system and method for providing assistance data to a wireless device. A location request may be received for the wireless device, the location request identifying location information for the wireless device. A reference location for the wireless device may then be determined as a function of a comparison of the location information and a region determined as a function of at least one of a mobile country code ("MCC"), mobile network code ("MNC"), and an Area-Identification ("Area-ID"), such as a location area code ("LAC") or a Radio Network Controller-Identification ("RNC-ID"). Assistance data may be provided to the wireless device as a function of the determined reference location.

18 Claims, 6 Drawing Sheets

U.S. PATENT DOCUMENTS

| | | |
|---|---|---|
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,449,486 B1 | 9/2002 | Rao |
| 6,463,290 B1 | 10/2002 | Stilp et al. |
| 6,483,460 B2 | 11/2002 | Stilp et al. |
| 6,492,944 B1 | 12/2002 | Stilp |
| 6,519,465 B2 | 2/2003 | Stilp et al. |
| 6,546,256 B1 | 4/2003 | Maloney |
| 6,563,460 B2 | 5/2003 | Stilp et al. |
| 6,591,112 B1 | 7/2003 | Siccardo et al. |
| 6,603,428 B2 | 8/2003 | Stilp |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,782,264 B2 | 8/2004 | Anderson |
| 6,782,265 B2 | 8/2004 | Perez-Breva et al. |
| 6,873,290 B2 | 3/2005 | Anderson et al. |
| 6,876,859 B2 | 4/2005 | Anderson et al. |
| 6,944,465 B2 | 9/2005 | Spain et al. |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2004/0203539 A1 | 10/2004 | Benes et al. |
| 2005/0091689 A1* | 4/2005 | Lee ................... 725/62 |
| 2006/0003775 A1 | 1/2006 | Bull et al. |
| 2006/0030333 A1 | 2/2006 | Ward et al. |
| 2007/0096981 A1 | 5/2007 | Abraham |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2008/0318594 A1 | 12/2008 | Monnerat |
| 2009/0005061 A1 | 1/2009 | Ward et al. |
| 2010/0093376 A1* | 4/2010 | del Castillo et al. ....... 455/456.6 |
| 2011/0171969 A1* | 7/2011 | Halivaara et al. .......... 455/456.1 |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR DETERMINING A REFERENCE LOCATION USING CELL TABLE DATA MINING

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an elevation of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message ("NAV").

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing. Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

A-GPS handset implementations generally rely upon provided assistance data to indicate which satellites are visible. As a function of the assistance data, a mobile device will attempt to search for and acquire satellite signals for the satellites included in the assistance data. A-GPS positioning generally relies upon the availability of a coarse location estimate to seed the positioning method. This coarse estimate may be utilized to determine a likely set of satellites from which a respective mobile device may receive signals. In the absence of a location estimate or in scenarios having a location estimate with a large uncertainty, the likely set of measurable satellites may be quite large. Further, each of these satellites may not be measurable (e.g., the satellite is no longer visible, etc.). If satellites are included in the assistance data that are not measurable by the mobile device, then the mobile device will waste time and considerable power attempting to acquire measurements for the satellite. Further, signaling methods often limit the number of satellites for which signals may be provided.

Accordingly, there is a need for a system and method to determine a reference location for a mobile device that would overcome the deficiencies of the prior art. Therefore, an embodiment of the present subject matter provides a method for determining a reference area where the location information, such as, but not limited to, a requested cell, is in the respective operators' network but no cell has been provisioned for it. Thus, an appropriate reference area may be determined by mining a network's cell table database. This determined reference area may later be utilized as an input to an exemplary algorithm selecting a best area to use to determine the satellites in view or may be used directly to determine the satellites in view. Embodiments of the present subject matter are also not restricted to any one location platform but may be employed by SLP, SMLC, SAS or LIS products.

Another embodiment of the present subject matter provides a method for determining a reference location of a wireless device. The method may comprise receiving a location request for the wireless device, the location request providing location information for the wireless device. A first estimated area may be determined as a function of whether the location information substantially corresponds to a first region defined by a mobile country code ("MCC"), mobile network code ("MNC"), and an Area-Identification ("Area-ID"), such as, but not limited to a location area code ("LAC") or a Radio Network Controller-Identification ("RNC-ID"). If the location information does not substantially correspond to the first region, then a second estimated area may be determined as a function of whether the location information substantially corresponds to a second region defined by an MCC and MNC. If the location information does not substantially correspond to the second region, then a third estimated area may be determined as a function of whether the location information substantially corresponds to a third region defined by an MCC. A reference location may then be determined for the wireless device as a function of one of the first, second or third estimated areas.

A further embodiment of the present subject matter provides a method for providing assistance data to a wireless device. The method may include receiving a location request for the wireless device, the location request identifying location information for the wireless device and determining a reference location for the wireless device as a function of a comparison of the location information and a region defined by at least one of an MCC, MNC, and Area-ID (e.g., LAC, RNC-ID, etc.). Assistance data may be provided to the wireless device as a function of the determined reference location.

An additional embodiment of the present subject matter provides a system for determining a reference location of a wireless device. The system may include a receiver for receiving a location request for the wireless device, the location request identifying location information for the wireless device. The system may also include circuitry for determining an estimated area as a function of a comparison of the location information and a region defined by any one or combination of an MCC, MNC, and an Area-ID. The system may include circuitry for determining a reference location for the wireless device as a function of one of the estimated area.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
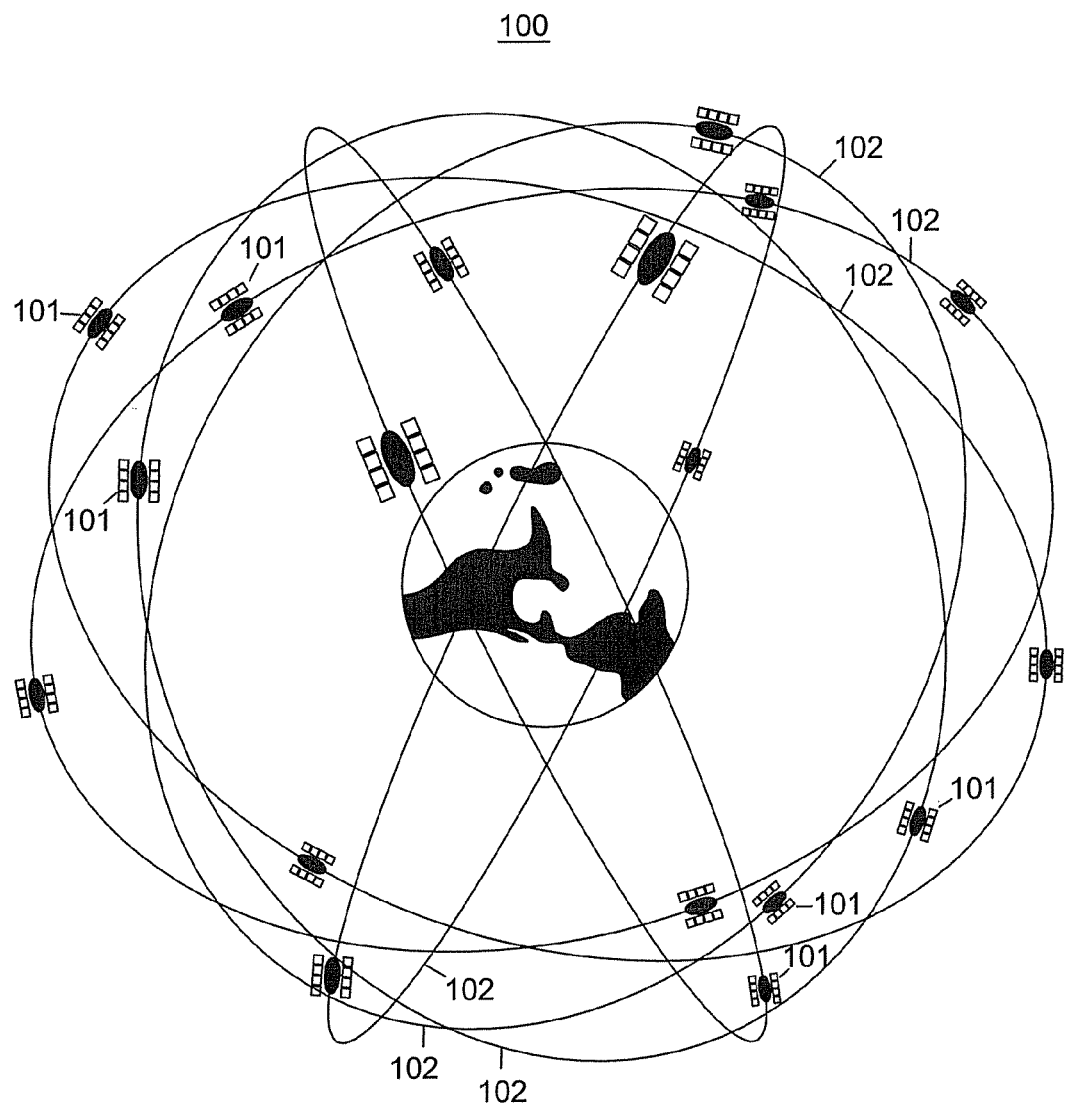
FIG. 1 is a schematic representation of a constellation of GPS satellites.

With reference to the figures where like elements have been given like numerical designations to facilitate an understanding of the present subject matter, the various embodiments of a system and method for determining a reference location for a mobile device using cell table data mining are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device.

Typical A-GPS information includes data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device. The MLC may then supply the device with the appropriate A-GPS assistance data for the set of satellites in view from this conventional location.

This typical process performs well when the approximate location possesses a small uncertainty; however, in the absence of an approximate location or where the approximate location possesses a large uncertainty (e.g., an uncertainty measured in hundreds of kilometers) the possible set of satellites may be quite large, and not all of the satellites in this set may be measurable. As each satellite requires time and resources to provide assistance data and signaling methods often limit the number of satellites for which signals may be provided, assistance data for only a subset of the set satellites may be provided to the mobile device. Since A-GPS implementations generally rely upon the provided assistance data to indicate which satellites are visible, the mobile device attempts to acquire only the satellite signals for the satellites included in the assistance data.

A wireless device such as, but not limited to, a secure user plane ("SUPL")—enabled terminal ("SET") may generally report an identification of a cell in a Location ID information element ("IE"). A respective server may then utilize the Location ID to ascertain a location of the cell in a database. However, there are times when the serving cell is not in the cell database because it has not been provisioned, or the SET has roamed to another network operators' communications system. There are also times when the cell information is not present in the Location ID, for example, when the SET is connected to the network via WiFi. Therefore, an aspect of embodiments of the present subject matter may determine a reference or an approximate location of a mobile device when appropriate location information is not provided or present in a respective location request. This determined reference location may then be utilized to determine the satellites that are in view from that area. Exemplary methods and systems to determine satellites that are in view are described in co-pending U.S. application Ser. No. 12/099,694, filed, Apr. 8, 2008, entitled, "System and Method for A-GPS Positioning of a Mobile Device," the entirety of which is incorporated herein by reference.

Several exemplary techniques may be utilized and are herein described to determine an approximate location of a mobile device or SET; however, the following description should not limit the scope of the claims appended herewith as it is envisioned that other techniques known to those of ordinary skill in the art may also be employed with embodiments of the present subject matter.

In one embodiment, the approximate location of a mobile device may be determined as a function of Location IDs. Generally, this embodiment may provide a database table that allows a network operator to define areas associated with a mobile country code ("MCC"), mobile network code ("MNC"), and/or Area-Identification ("Area-ID"). For example, if the respective network is a GSM EDGE Radio Access Network ("GERAN"), the Area-ID would be a location area code ("LAC"), and if the respective network is a UMTS Terrestrial Radio Access Network ("UTRAN"), the Area-ID would be a Radio Network Controller-Identification ("RNC-ID"). The network operator may thus define or determine areas as a function of MCC(s), MCCs and MNCs, and MCCs, MNCs and Area-IDs. These areas may be defined as a bounding polygon by provisioning boundaries thereto. For example, if the defined area is a rectangle, the area may be provided with boundaries comprising a northern latitude, southern latitude, eastern longitude and western longitude. Of course, any number or type of polygons may be defined or provisioned having a series of vertices but may also comprise other shapes having non-intersecting vertices such as an ellipse, circle, or shapes defined by one or more irregular boundaries, etc.

In an exemplary method and system according to an embodiment of the present subject matter, a cell database may include all of the cells that are in that operators' network. The database may be keyed upon a combination of fields depending on the cellular access technology; however, the format may generally contain the following fields, or variants of them, MCC, MNC, Area-ID (e.g., LAC, RNC-ID, etc.), Cell ID, etc. It may generally be assumed that cells within the same MCC are located within the same country. Similarly, cells having the same MCC and MNC are also located within the same country. Further, cells having the same MCC, MNC and Area-ID will be located within the same region.

One embodiment of the present subject matter mines the cells from a cell database, and for each unique combination of MCC, MNC and/or Area-ID, an area or region may be created and/or cached which may geographically cover all provisioned cells. This created and/or cached area may be a bounding box, a polygon with a series of vertices, an ellipse or another shape. Regions may be created and cached for each unique combination of MCC, MNC and Area-IDs that exist in the cell database. Regions may also be created and cached for each unique combination of MCC and MNCs. Further, regions may be created and cached for each MCC. These created regions or areas may be later utilized in an exemplary algorithm to determine a best approximate area where the mobile device or SET may be, or these regions may be used directly as an approximate area from which satellites are determined for satellite assistance data purposes. When a location request is received requiring the calculation of GPS assistance data, then an exemplary location determining system, e.g., MLC or LIS, may search for the cell in the database. If this fails, that is, there is no cell in the database, then it may search for an area that matches or substantially corresponds to the finest granularity of MCC, MNC and/or Area-ID from any location information provided in the request. For example, the MLC may determine whether a correlation exists with an MCC, MNC, and Area-ID to the location information. If such a correlation cannot be found, then the MLC may determine if a correlation exists with an MCC and MNC. In the event such a correlation cannot be found, then the MLC may determine if a correlation exists with MCC alone. Such determined areas are likely to include the respective mobile device or SET.

Figure 2:
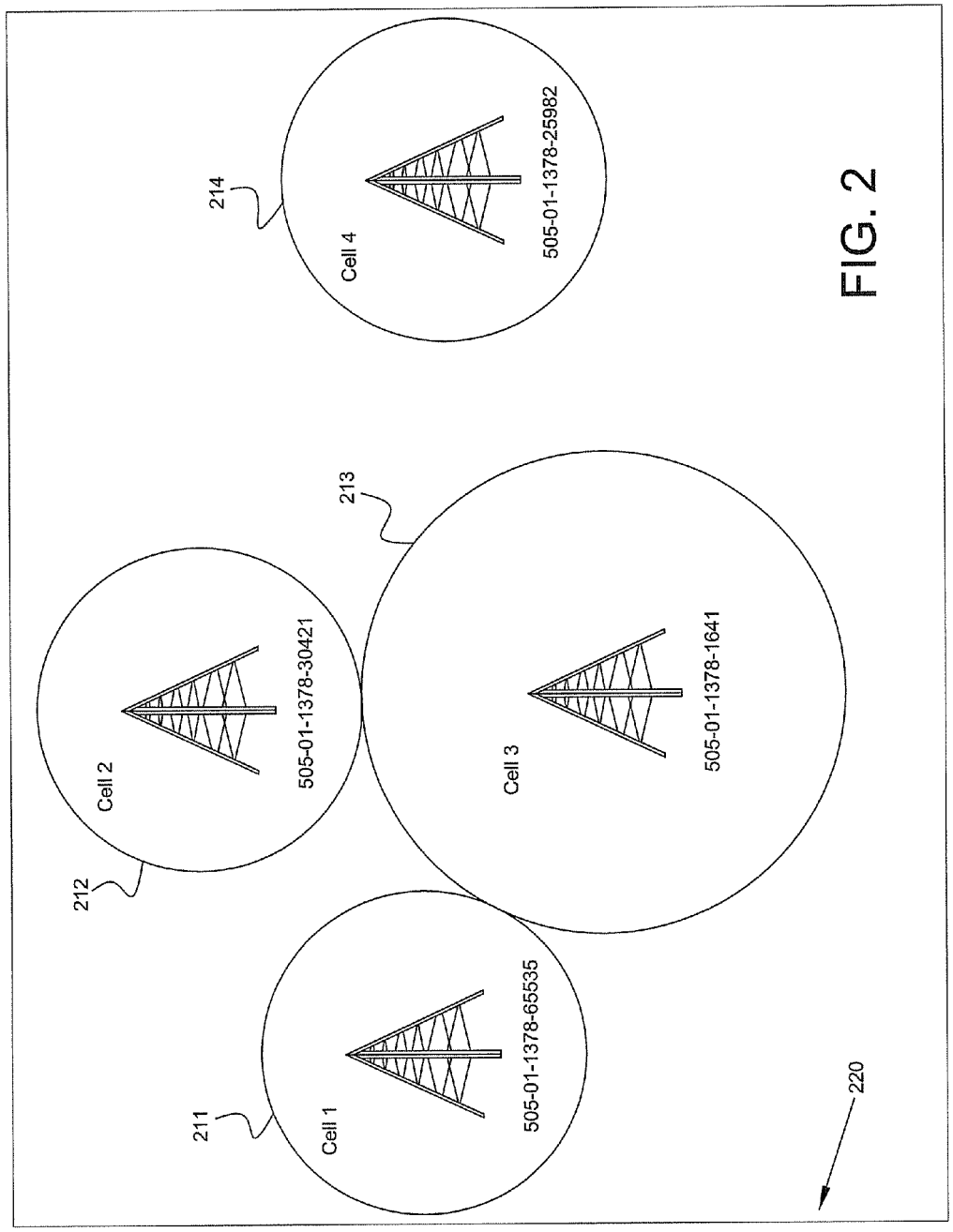
FIG. 2 is an illustration of one embodiment of the present subject matter.

FIG. 2 is an illustration of one embodiment of the present subject matter. With reference to the non-limiting example depicted in FIG. 2, a group of cells 211, 212, 213, 214 are provided for a database having an MCC, MNC, and LAC of 505-01-1378, respectively. A bounding box or approximate area 220 may be generated encompassing all the cells 211-214. Of course, the area 220 may be defined as another shape or polygon depending upon the geographic arrangement of the cells, and the rectangular shape of the area 220 should not limit the scope of the claims appended herewith.

In the event that a location request or query arrives at a respective MLC identifying a cell or having other location information not in the respective database, data may be mined as a function of MCCs, MNCs and Area-IDs (in this case LAC), and an approximate area or region ascertained. If no area exists within a predetermined threshold, then data may be mined as a function of MCCs and MNCs, and an approximate area or region ascertained. Again, if no area exists within a predetermined threshold, then the data may be mined as a function of MCCs and an approximate area or region ascertained. Depending upon the amount of data, number of cells, etc. in the respective database, an uncertainty area and/or the predetermined threshold may be adjusted once new cell locations are added to the database.

Figure 3:
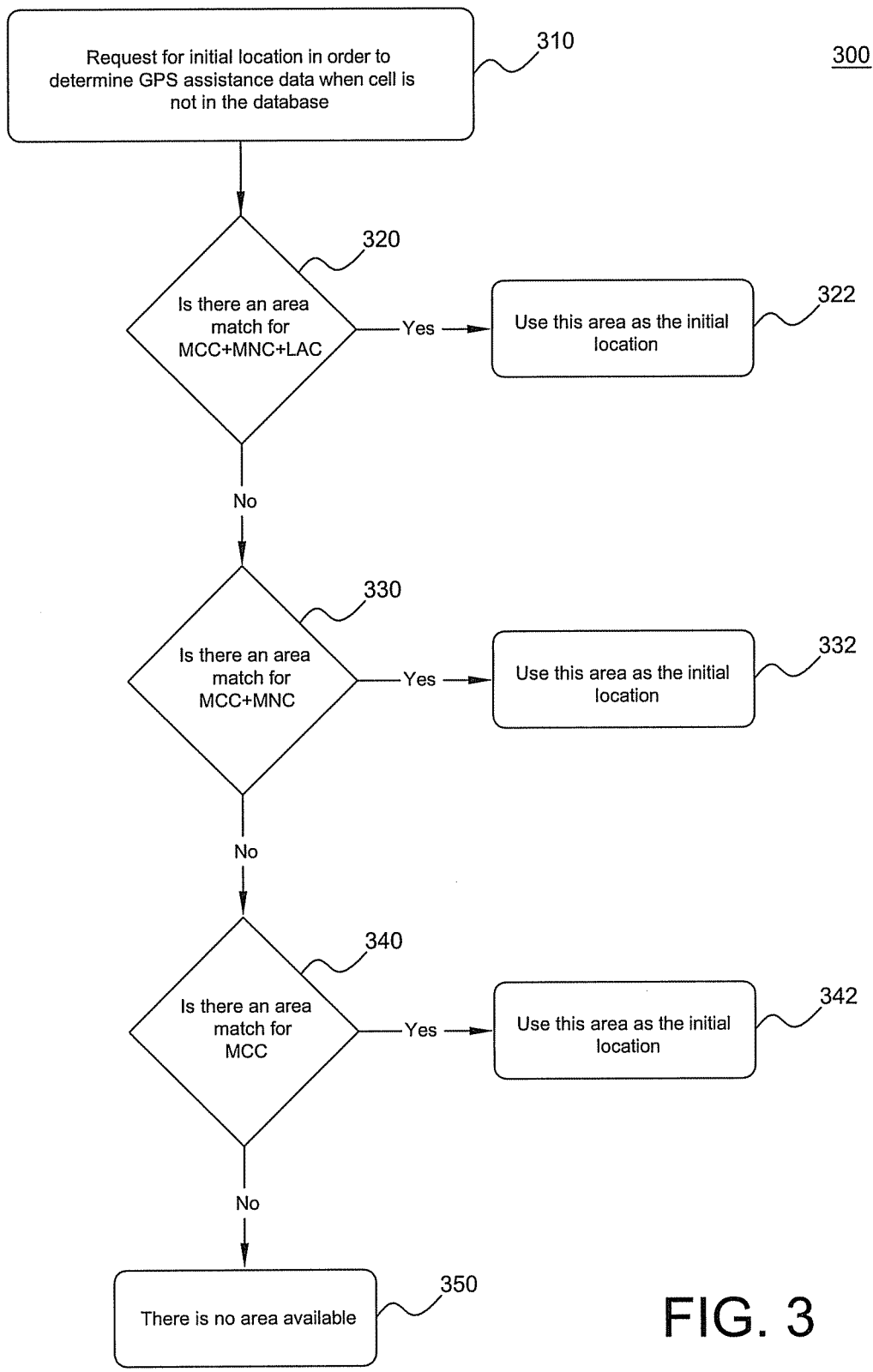
FIG. 3 is an illustration of an exemplary algorithm according to an embodiment of the present subject matter.

FIG. 3 is an illustration of an exemplary algorithm according to one embodiment of the present subject matter. With reference to FIG. 3, an algorithm 300 is depicted for determining an approximate area for a mobile device using mined data in a cell table. In step 310, a request may be received for an initial location of a mobile device to determine GPS assistance data for the device when a cell is not in the respective database. At step 320, if an area defined by the MCC, MNC and Area-ID (in this case LAC) substantially corresponds to location information within the request, then this defined area may be provided as an initial or reference location for the device at step 322. Similarly, if this defined area does not substantially correspond to the location information, then it may be determined, at step 330, whether an area defined by the MCC and MNC substantially corresponds to the location information within the request. This defined area may then be provided as an initial or reference location for the device at step 332 or, in the event the area fails to match or correspond, at step 340, it may be determined whether an area defined by the MCC substantially corresponds to the location information in the request; this area may then be provided as an initial or reference location for the device at step 342. If no area is available, at step 350, a default area may be assigned, the process repeated, or the process terminated. Therefore, generally, an area may be matched by initially attempting to access the area for the smallest bounding area, and if that fails, the next area may be selected.

It is therefore an object of embodiments of the present subject matter to improve the situation of calculating a reference area where a requested cell is in an operators' network but there is no cell provisioned for it through mining a cell table. It is also an object to utilize this area as an input to an algorithm selecting a reference location to determine the satellites in view or the area may be used directly to determine the satellites in view.

Figure 4:
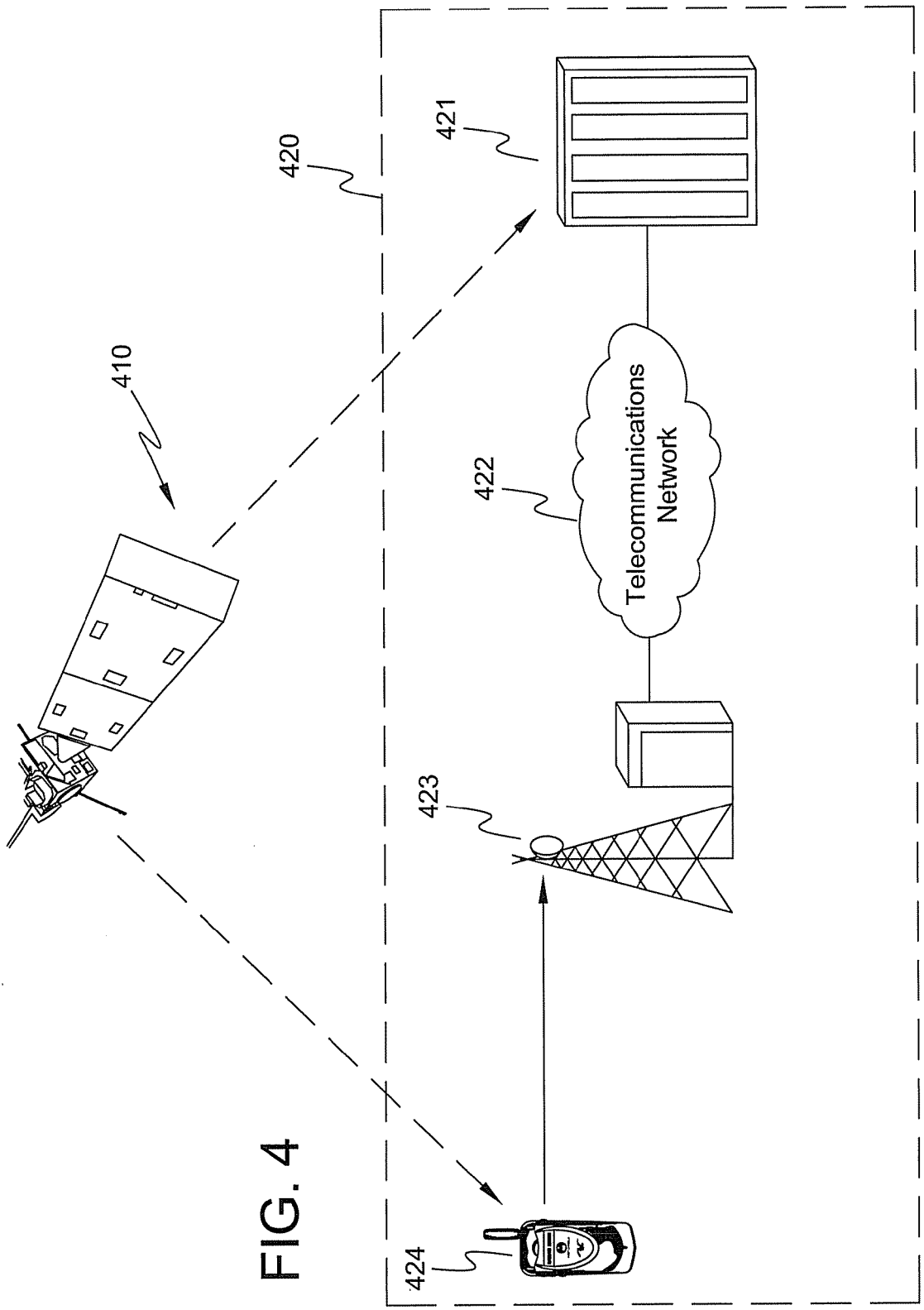
FIG. 4 is a schematic representation for implementing one embodiment of the present subject matter.

FIG. 4 is a schematic representation for implementing embodiments of the present subject matter. With reference to FIG. 4, a satellite system 410 may communicate with a terrestrial system 420. An exemplary satellite system 410 may be a GNSS such as, but not limited to, a GPS, Galileo system, GLONASS system, QZSS, Compass system, Bediou system, etc. The ground system 420 may include a cellular network having a location center 421 and may receive information from or include a SBAS, WAAS, EGNOS, digital television network, and combinations thereof. The location center 421 may be an MLC, LIS or other network component such as a central office configured to communicate with a telecommunications network 422 and/or at least one base station 423. The location center 421 may include a receiver for receiving signals transmitted from a mobile device 424, and circuitry for determining the location of the mobile device 424 as a function of received signals from the device 424. In one embodiment of the present subject matter, the device 424 may communicate with the base station 423 to acquire GPS assistance data. The location center 421 may also receive satellite information from GPS satellites. The satellite information may include the satellite's broadcast ephemeris information of the broadcasting satellite or that of all satellites or that of selected satellites. Further, the location center 421 may manipulate the assistance data to prevent the device 424 from searching and attempting to acquire signals from these one or more plural satellites. This information may then be transmitted or relayed to the mobile receiver and utilized for location determination. The location center 421 may relay the information back to the device 424 or use the information, either singularly or along with some preliminary estimation of the device's location, to assist the device in a geographic location determination. In another embodiment, any one or plural steps illustrated in FIGS. 2 and 5-6 may be implemented at the location center 421 and communicated to the device 424. Of course, the estimated location of the device 424 may be determined as a function of additional signals provided by the network 422.

The location center 421 may also include one or more databases, e.g., a cell table database, some of which include information from exemplary reference networks. Exemplary reference networks may include a plurality of geographically dispersed reference stations and may include fixed reference stations, mobile reference stations, or combinations thereof. In a further embodiment, the location center 421 may include a transmitter for transmitting to the mobile device 424 assistance data, a location request, and other information and data. Exemplary devices 424 may be, but are not limited to, a cellular device, text messaging device, computer, portable computer, vehicle locating device, vehicle security device, communication device, or wireless transceiver. The location center 421 may include circuitry for determining an estimated area as a function of a comparison of location information in a received location request and an area defined as a function of any one or combination of MCCs, MNCs, and Area-IDs and may include circuitry for determining a reference location for the wireless device as a function of one of the estimated area.

Figure 5:
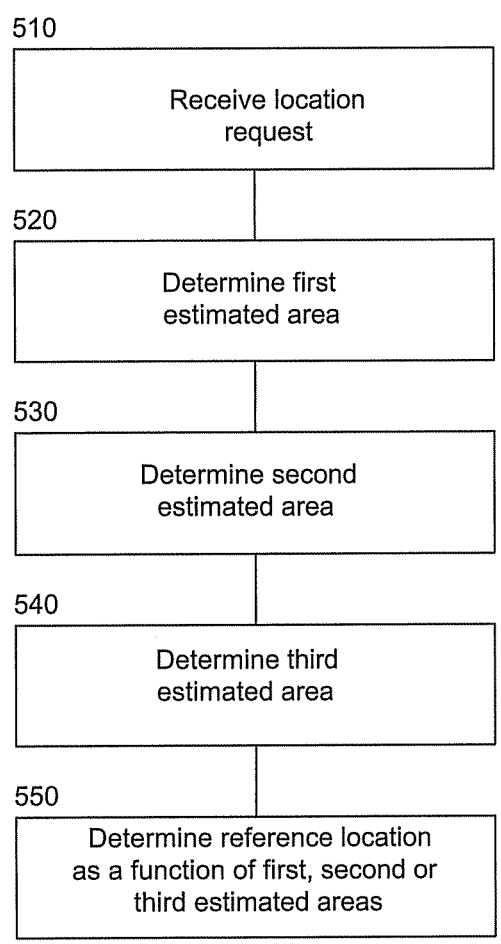
FIG. 5 is an illustration of an exemplary algorithm according to one embodiment of the present subject matter.

FIG. 5 is an illustration of an exemplary algorithm according to an embodiment of the present subject matter. With reference to FIG. 5, a method 500 is provided for determining a reference location of a wireless device. At step 510 a location request may be received for the wireless device, the location request providing location information for the wireless device. Exemplary location information may be, but is not limited to, the identification of an approximate cell. At step 520, a first estimated area may be determined as a function of whether the location information substantially corresponds to a first region determined as a function of one or more MCCs, MNCs, and Area-IDs. The Area-ID may be, but is not limited to, a LAC or RNC-ID. If the location information does not substantially correspond to the first region, then a second estimated area may be determined at step 530 as a function of whether the location information substantially corresponds to a second region determined as a function of one or more MCCs and MNCs. If the location information does not substantially correspond to the second region, then a third estimated area may be determined at step 540 as a function of whether the location information substantially corresponds to a third region determined as a function of one or more MCCs. At step 550, a reference location may be determined for the wireless device as a function of one of the first, second or third estimated areas. The first, second and/or third regions may be a polygon or any other suitable geometric figure as previously described. In one embodiment, assistance data may be provided to the wireless device as a function of the determined reference location and may be provided as a function of one or more boundaries of the determined reference location. In another embodiment, the method 500 may further include the steps of providing the determined reference location to the wireless device, and determining a geographic location of the wireless device.

Figure 6:
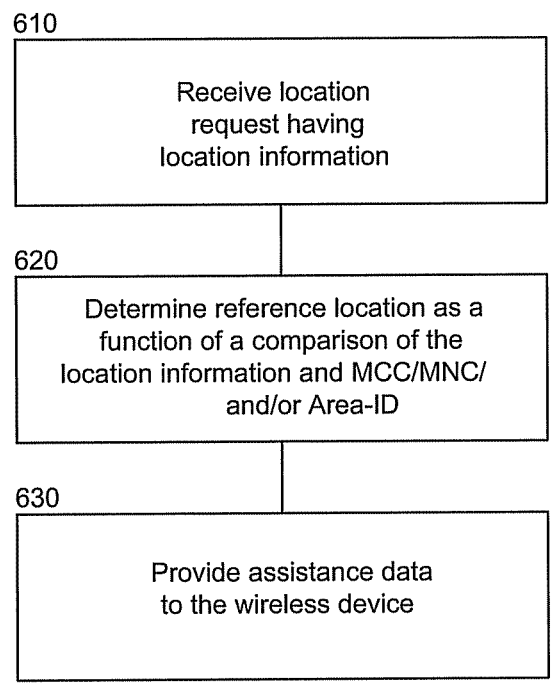
FIG. 6 is an illustration of an exemplary algorithm according to a further embodiment of the present subject matter.

FIG. 6 is an illustration of an exemplary algorithm according to a further embodiment of the present subject matter. With reference to FIG. 6, a method 600 is provided for sending assistance data to a wireless device. At step 610, a location request may be received for the wireless device, the location request providing location information for the wireless device. Exemplary location information may be, but is not limited to, the identification of an approximate cell. At step 620, a reference location may be determined for the wireless device as a function of a comparison of the location information and a region determined as a function of at least one of an MCC, MNC, and an Area-ID. At step 630, assistance data may be provided to the wireless device as a function of the determined reference location. In one embodiment, the step of determining a reference location may include mining a database for an area corresponding to the finest possible granularity of MCC, MNC, Area-ID, or combinations thereof, the area used as the determined reference location.

As shown by the various configurations and embodiments illustrated in FIGS. 1-6, a system and method for determining a reference location for a mobile device using cell table data mining have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method for determining a reference location of a wireless device, comprising the steps of:
   (a) receiving a location request for the wireless device, the location request providing location information for the wireless device;
   (b) determining a first estimated area as a function of whether the location information substantially corresponds to a first region determined as a function of one or more mobile country codes ("MCC"), mobile network codes ("MNC"), and Area-Identifications ("Area-ID");
   (c) if the location information does not substantially correspond to the first region, then determining a second estimated area as a function of whether the location information substantially corresponds to a second region determined as a function of one or more MCCs and MNCs;
   (d) if the location information does not substantially correspond to the second region, then determining a third estimated area as a function of whether the location information substantially corresponds to a third region determined as a function of one or more MCCs; and
   (e) determining a reference location for the wireless device as a function of one of the first, second or third estimated areas.

2. The method of claim 1 further comprising the step of providing assistance data to the wireless device as a function of the deter mined reference location.

3. The method of claim 2 wherein the assistance data is provided as a function of one or more boundaries of the determined reference location.

4. The method of claim 1 further comprising the steps of:
(f) providing the determined reference location to the wireless device; and
(g) determining a geographic location of the wireless device.

5. The method of claim 1 wherein the first, second or third regions is a polygon.

6. The method of claim 1 wherein the Area-ID is selected from the group consisting of: location area code ("LAC") and Radio Network Controller-Identification ("RNC-ID").

7. The method of claim 1 wherein the location information is the identification of an approximate cell.

8. The method of claim 1 wherein each of steps (b)-(d) further includes mining a database for an area corresponding to a finest possible granularity of MCC, MNC, Area-ID, or combinations thereof.

9. The method of claim 1 wherein the wireless device is selected from the group consisting of a cellular device, text messaging device, computer, portable computer, vehicle locating device, vehicle security device, communication device, and wireless transceiver.

10. A method for providing assistance data to a wireless device, comprising the steps of:
(a) receiving a location request for the wireless device, the location request identifying location information for the wireless device;
(b) determining a first estimated area as a function of whether the location information substantially corresponds to a first region determined as a function of one or more mobile country codes ("MCC"), mobile network codes ("MNC"), and Area-Identifications ("Area-ID");
(c) if the location information does not substantially correspond to the first region, then determining a second estimated area as a function of whether the location information substantially corresponds to a second region determined as a function of one or more MCCs and MNCs;
(d) if the location information does not substantially correspond to the second region, then determining a third estimated area as a function of whether the location information substantially corresponds to a third region determined as a function of one or more MCCs;
(e) determining a reference location for the wireless device as a function of a comparison of the location information and a fourth region within a predetermined threshold, the fourth region determined as a function of one of the first, second, or third estimated areas; and
(f) providing assistance data to the wireless device as a function of the determined reference location.

11. The method of claim 10 wherein the location information is the identification of an approximate cell.

12. The method of claim 10 wherein the fourth region is a polygon.

13. A system for determining a reference location of a wireless device comprising:
(a) a receiver for receiving a location request for the wireless device, the location request identifying location information for the wireless device;
(b) circuitry for determining a first estimated area as a function of whether the location information substantially corresponds to a first region determined as a function of one or more mobile country codes ("MCC"), mobile network codes ("MNC"), and Area-Identifications ("Area-ID");
(c) circuitry for determining if the location information does not substantially correspond to the first region, then determining a second estimated area as a function of whether the location information substantially corresponds to a second region determined as a function of one or more MCCs and MNCs;
(d) circuitry for determining if the location information does not substantially correspond to the second region, then determining a third estimated area as a function of whether the location information substantially corresponds to a third region determined as a function of one or more MCCs; and
(e) circuitry for determining a reference location for the wireless device as a function of one of the estimated areas.

14. The system of claim 13 further comprising a transmitter for transmitting assistance data to the wireless device as a function of the determined reference location.

15. The system of claim 13 wherein the Area-ID is selected from the group consisting of: location area code ("LAC") and Radio Network Controller-Identification ("RNC-ID").

16. The system of claim 13 first, second, or third regions is a polygon.

17. The system of claim 13 wherein the location information is the identification of an approximate cell.

18. The system of claim 13 wherein the wireless device is selected from the group consisting of a cellular device, text messaging device, computer, portable computer, vehicle locating device, vehicle security device, communication device, and wireless transceiver.

* * * * *